US005162069A

United States Patent [19]

Morris

[11] Patent Number: 5,162,069

[45] Date of Patent: Nov. 10, 1992

[54] CASSETTE APPLICATOR HEAD SYSTEM

[75] Inventor: David A. Morris, Edina, Minn.

[73] Assignee: Accraply Incorporated, Minnetonka, Minn.

[21] Appl. No.: 860,195

[22] Filed: Mar. 26, 1992

Related U.S. Application Data

[63] Continuation of Ser. No. 554,288, Jul. 16, 1990.

[51] Int. Cl.[5] .............................................. B32B 31/00

[52] U.S. Cl. .................................... 156/363; 156/354; 156/542; 226/196

[58] Field of Search ............... 156/360, 361, 362, 363, 156/354, 355, 540, 541, 542; 226/196, 197, 198, 199

[56] References Cited

U.S. PATENT DOCUMENTS

| | | | |
|---|---|---|---|
| 3,565,724 | 2/1971 | Yamaguchi | 156/354 |
| 3,944,455 | 3/1976 | French | 156/542 |
| 3,997,384 | 12/1976 | Kuring et al. | 156/542 |
| 4,285,752 | 8/1981 | Higgins | 156/523 |
| 4,455,002 | 6/1984 | Saito et al. | 226/196 |
| 4,562,773 | 1/1986 | Diggle | 156/363 |
| 4,624,734 | 11/1986 | Voltmer et al. | 156/542 |
| 4,840,694 | 6/1989 | Brookman et al. | 156/361 |

*Primary Examiner*—David A. Simmons

*Assistant Examiner*—Robert Barker

*Attorney, Agent, or Firm*—Oldham, Oldham & Wilson Co.

[57] ABSTRACT

An improved label applicator system as provided for reducing the time required to convert from one label type to another. The device comprises one or more cassette assemblies each having a supply spool, a rewind spool, routing rollers and a peeler arm. Such cassettes are removably attachable to an applicator head assembly which comprises a drive means and a control means. This invention enables the operator to pre-thread a cassette prior to attachment to the applicator head assembly. The changeover from one label type to another can now be accomplished by removing one cassette assembly from the applicator machine and replacing it with a pre-threaded cassette assembly containing an alternative label type.

24 Claims, 11 Drawing Sheets

CASSETTE APPLICATOR HEAD SYSTEM

This is a continuation of copending application Ser. No. 07/554,288, filed on Jul. 16, 1990.

TECHNICAL FIELD

The present invention relates to an improved pressure sensitive label applicator. More specifically, the present invention relates to cassette assembly having a supply reel, a takeup reel, routing rollers and a peeler arm and which is removably mounted onto an applicator head. This invention enables the operator to pre-thread cassette and to switch the label spools before attachment to the applicator load, thereby reducing changeover time.

BACKGROUND OF THE INVENTION

Systems for labeling products in the production process are well known. For example, certain labeling systems utilize a conveyor to transport products to be labeled past a labeling site. As the products approach the labeler, a low limit control device detects and meters the presence of the product to determine whether enough product is present to allow passage into The labeler. As the products enter the labeler, synchronized infeed timing screws position, space, and meter the products on the conveyor for subsequent labeling.

An overhead stabilizer assumes control of the product as it leaves the infeed timing screws. This stabilizer functions to hold the product securely against the conveyor as the product passes through the labeler.

The product passes an electronic sensor device as it approaches the applicator heads. This product sensor is responsible for detecting the presence of the product and subsequently initiating dispensing of a label. A label sensor is responsible for detecting the movement of the label and web during dispensing and signaling the applicator to stop dispensing.

The label is applied to the product by the applicator head system. A web of label material is unwound from the supply roll, guided across an idler roll and down an apron plate to the peeler plate. The peeler plate guides the web to the peeler arm. The peeler arm peels the label from the web as it is pulled around the tip toward a pressure roller/knurled roller assembly. These applicator heads are operated by a motorized indexing system.

The tension wiper holds the label flat as it passes under the label sensor. The label wiper which provides the initial touch of the label to the product, is mounted to the peeler plate and extends past the arm in order to wipe the leading edge of the label to the product as it passes the peeler arm.

In other label applicator systems, the label, at this point, may be dispensed from the peeler arm onto a vacuum arid for subsequent blow-on or tamp-on application to either a stationary or moving product.

The pressure roller/knurled roller assembly is responsible for pulling the label web from the supply roll to the peeler arm, as well as pulling the used web liner from the peeler arm to the rewind roll. A takeup reel serves to rewind the used web material. Finally, the labeled product may be passed through a label wiper roller or brush system which contacts the label and ensures that the label is securely affixed to the product.

FIG. 1 illustrates one prior art pressure sensitive labeling system currently used in the industry. As previously stated, these systems are well known in the art and one such manufacturer is Accraply Inc. of Minnetonka, Minnesota. The prior art applicator systems normally comprise a series of components or sub-assemblies which are collectively coordinated to perform the labeling function. The previous discussion illustrates the labeling process of only one labeling system. Many other labeling systems are known which apply labels to a variety of product locations and to surfaces of varying contours.

These systems, while adequate to perform the desired function, require substantial changeover time and multiple adjustments when converting to alternative labels. Currently, when a changeover is needed on a conventional label applicator machine, the operator must stop the machine, unthread the web from the applicator head system, and remove both the supply reel and takeup reel. Subsequently, a new label roll must be mounted on the supply spool, the web must be threaded through the system and the leading end of the web must be attached to the rewind spool. Before restarting the machine, the operator must ensure that the web is properly aligned between the supply roll and the peeler plate to avoid tracking problems, with adjustments made as necessary.

Due to the limitations and disadvantages of the prior art, the present invention is subsequently presented.

SUMMARY OF THE INVENTION

Briefly stated, the invention herein disclosed provides a novel applicator head system for use with known technology of applicator machines. The present invention solves the problem of extended changeover time by disclosing an applicator head system in the form of a removable cassette assembly. This cassette assembly contains a supply reel and spool, a takeup reel and spool, routing rollers and a peeler edge mounted on a platform which may be removed from the remainder of the machine's applicator head. The changeover from one label type to another is now accomplished by removing one cassette assembly from the applicator machine and replacing it with a prethreaded cassette assembly containing an alternative label type.

Based on the foregoing, it is therefore an object of the present invention to provide an improved applicator head system which is in the form of a cassette assembly.

It is also an object of the present invention to provide a cassette applicator head assembly which significantly reduces the time required for converting the machine from one label type to another.

It is a further object of the present invention to provide a cassette applicator head assembly which can be threaded prior to installation on an applicator machine.

It is a further object of the present invention to provide a cassette applicator head assembly which requires fewer adjustments than the non-cassette prior art.

It is still a further object of the present invention to provide a cassette applicator head assembly which occupies less space than the applicator head assemblies of prior art conventional applicator machines.

It is still a further object of the present invention to provide a cassette label assembly which is versatile and can be used with a wide variety or products.

It is still a further object of the present invention to provide a cassette label assembly which is capable of routing the web containing the labels through more than one plane from the supply reel to the takeup reel.

It is still a further object of the present invention to provide a cassette label assembly which allows for the controlling, monitoring and accounting of the number of labels issued for a specific assignment. Such accountability is desirable in industries such as pharmaceuticals, etc.

These and other objects and advantages will become more readily apparent from the detailed description taken in conjunction with the drawings. Such objects and advantages are achieved by a cassette assembly comprising a platform, said platform of sufficient dimension to receive a plurality of sub-assemblies, a supply means, a label applying means, a means for routing said web along a pathway and an aperture in said platform of sufficient size and positioned such that said drive of said applicator head assembly is capable of passing therethrough to operatively engage said web on said pathway when said cassette assembly is removably mounted on said applicator head assembly.

BRIEF DESCRIPTION OF THE DRAWINGS

Reference should be made to the accompanying drawings where.

DETAILED DESCRIPTION OF THE PREFERRED EMBODIMENT

This invention will be described in detail with reference to the preferred embodiments thereof. Like elements are identified by referenced numerals throughout the specification.

Figure 1:
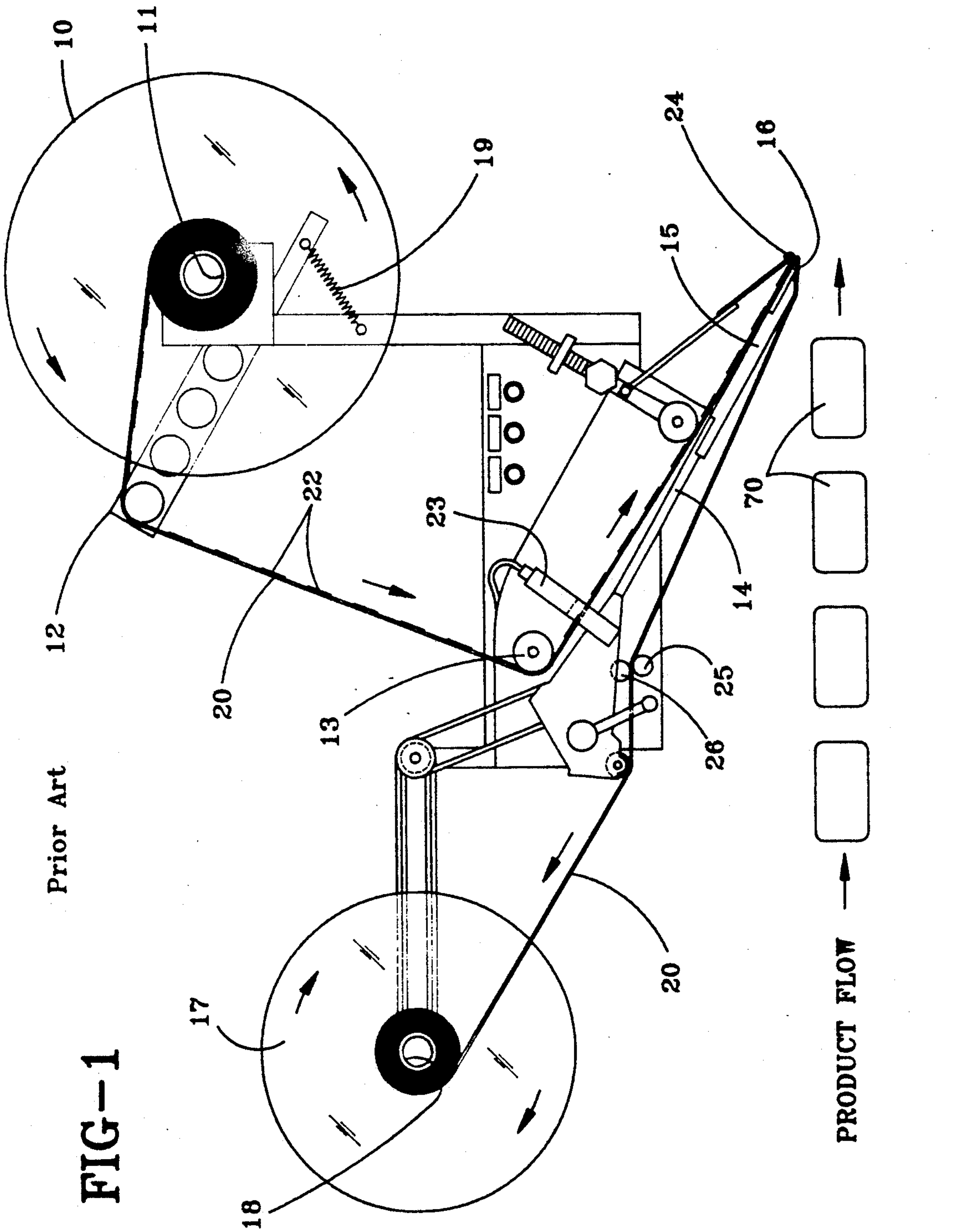
Prior Art FIG—1
FIG. 1 is a top perspective view of a conventional applicator system which is known in the prior art.

Now, with reference to the drawings and particularly to FIG. 1, FIG. 1 illustrates one example of a conventional label applicator system as is well known in the prior art. Product 70 is aligned and transported past and in close proximity to peeler arm 16 such that a label 22 is applied to each product 70. The alignment and transport processes are well known and fall outside of the scope of this application.

One standard applicator head system, as illustrated in FIG. 1 includes a label bearing web 20 routed from a supply roller 10 mounted on supply spool 11 through various tension, transport, alignment, sensing and application components to a take-up reel 17 mounted on take-up spool 18. The transporting or drive elements are principally the drive and pressure rollers, 25 and 26 which serve to draw the web from supply roller 10 and around the peeler arm 16. Dancer arm 12 serves to maintain a tension on web 20. Such tension is accomplished by biasing the force of the web 20 as it is pulled over dancer arm 12 against a spring means attached to the opposite end of dancer arm 12 and secured to a part on the applicator frame. A plurality of idler rollers, such as the roller referenced by numeral 13, are provided to maintain the alignment of the web throughout the label application process. A label sensor 23 is positioned such that the web 20 passes between the emitter and receiver components of label sensor 23 to detect the presence of a label 22. The application of a label 22 to a product 70 is accomplished by guiding the label bearing web 20 along the apron plate 14 to peeler plate 15. At the remote end of peeler plate 15, peeler arm 16 is a convex structure about which web 20 is deflected sufficiently to cause label 22 to tend to peel away from web 20.

A label wiper 24 is mounted on the peeler arm 16 and extends just past the peeler arm 16. The label wiper 24 initiates the label 22's contact with product 70 and wipes the label onto product 70 as the product moves past the peeler arm 16. Once the label has been removed from web 20, the expended web is collected on rewind roller 17 by rotatably winding web 20 around spool 18.

The individual elements found in the embodiments of the present invention as illustrated in FIGS. 2-9 operate in a manner substantially similar to that of the prior art. However, the modifications presented make the present invention desirable over the prior art.

Figure 2:
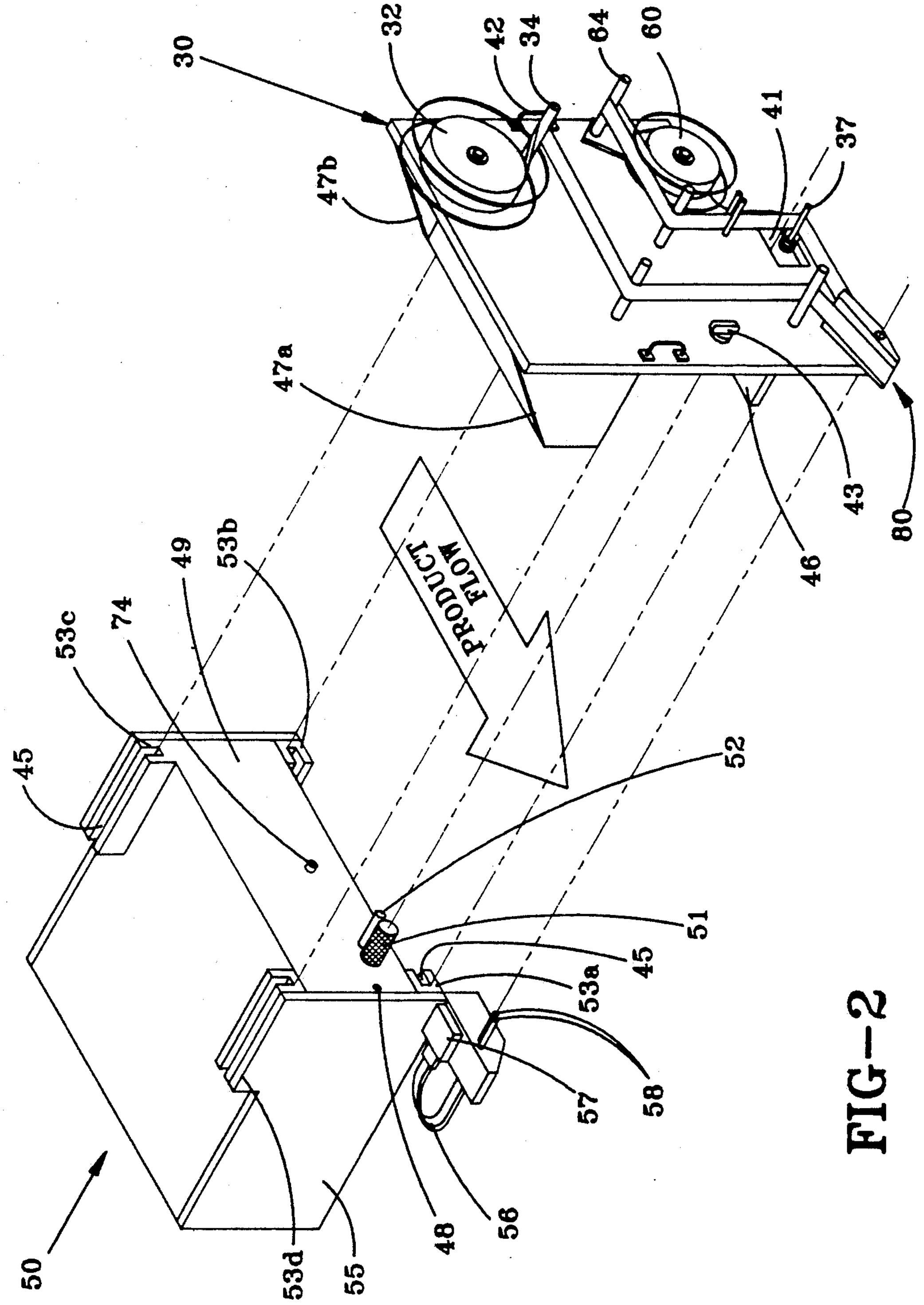
FIG. 2 is an exploded view of one cassette label applicator head assembly as it engages a corresponding applicator head.

FIG. 2 discloses one embodiment of the present invention and presents a cassette assembly 30 containing the components necessary to perform product labeling which can be removably attached to the powered applicator head, generally 50. The applicator head 50 discloses a drive enclosure 55 which is essentially a box-type structure containing a drive mechanism 71 therein. Drive mechanisms 71 such as electric motors and the like used for powering label applicator machines are well known in the art. The drive mechanism 71 can be positioned inside of one or more drive shafts in either horizontal or vertical orientation.

The exploded view of FIG. 2 reveals surface 49 which abuts platform 31 of cassette assembly 30. Drive roller 51 is cylindrical in shape and securely attached to a drive shaft rotated by the drive mechanism. A pressure roller 52 also of cylindrical shape is placed in close proximity to drive roller 51. Pressure roller 52 is preferably freely rotatable and is placed adjacent to drive roller 51 so that as the web 20 passes between drive roller 51 and pressure roller 52, the pressure of drive roller 51 pressing against pressure roller 53 results in a continuous length of web 20 being drawing through the system. The outer circumference of either roller, 51 or 52, may contain projections or knurls to aid in the indexing capabilities of this assembly.

Also located on surface 49 of drive enclosure 55 is rewind drive 54. Rewind drive 54 comprises a shaft which is rotatably driven by drive mechanism and which extends outwardly from surface 49 to operatively and removably engage take-up spool 61 of cassette assembly 30. Such rewind drive rotatably moves take-up reel 60 in a circular rotation to collect web 20 once the labels 22 have been removed.

Surface 49 possesses an irregular shaped aperture 48. Aperture 48 is designed to permit passage of a projection from locking device 46 on cassette assembly 30 and to restrict the removal of the same projection when locking device 46 has been rotated from the inserted position. Locking device 46 and aperture 48 cooperatively serve to retain cassette assembly 30 onto applicator head 50 until removal is desired.

Turning now to the cassette assembly illustrated in FIG. 2–5, this cassette assembly comprises a platform 31 with components of a label applicator mechanism operatively attached on one surface and a means for aligning and attaching cassette assembly 30 the applicator head 50 on the opposite side.

Platform 31 of cassette 30 is essentially rectangular in shape and preferably made of a rigid thermoplastic material. However, platform 31 is contemplated as being of various shapes and sizes depending on particular applications and may be made of any rigid material known in the art.

Cassette assembly 30 is designed to be removably attachable to applicator head 50. Removable attachment is desirable so that multiple cassette assemblies 30 may be employed which can be prethreaded prior to attachment to the applicator head 50. Therefore, when alternative labels are desired or the labels 22 on supply reel 32 are exhausted, the attached cassette assembly 30 may be quickly and easily removed and replaced with a prethreaded cassette assembly 30 containing the desired labels. In this way, machine downtime is reduced. Any necessary adjustments may be made on the cassette prior to installation on applicator head 50.

FIG. 2 discloses cassette assembly 30 as being aligned and attached to applicator head 50 using attachment flanges 46 and 47*a*–*b* which slidably engage notches 45 in attachment guides 53*a*–*d*. Notches 45 in attachment guides 53*a*–*d* have one open side and at least one open end and are dimensioned with a width slightly larger than the width of flanges 47*a*–*b* and 46 to retain the same with a friction fit. Locking device 46 cooperatively engages aperture 48 to retain cassette assembly 30 in place as discussed previously herein, until removal of cassette assembly 30 is desired.

Figure 3:
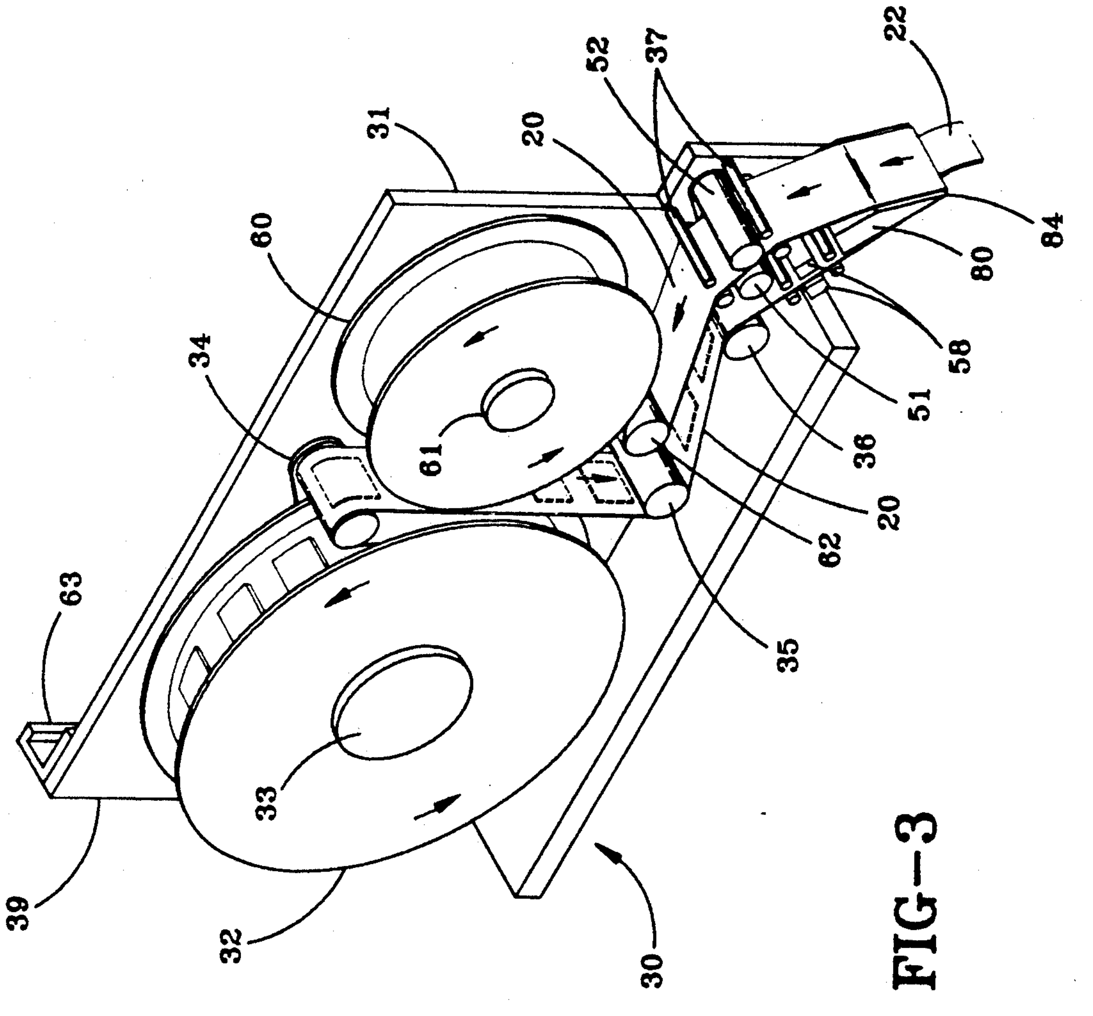
FIG. 3 is a perspective view of one embodiment of a cassette label applicator head assembly according to the present invention.

FIG. 3 illustrates an alternative method of attachment of cassette assembly 30 to drive enclosure 55, as referenced by numeral 63. Numeral 63 shows a groove formed along a substantial length of edge 39 on platform 31 which engages a flange formed by a portion of surface 49 which extends past its point of intersection with an adjoining surface. The means of attachment of cassette assembly 30 to drive enclosure 55 disclosed in FIGS. 2 and 3 are provided as currently preferred means of attachment and illustration but any number of means for attachment known in the art may be utilized.

Figure 4:
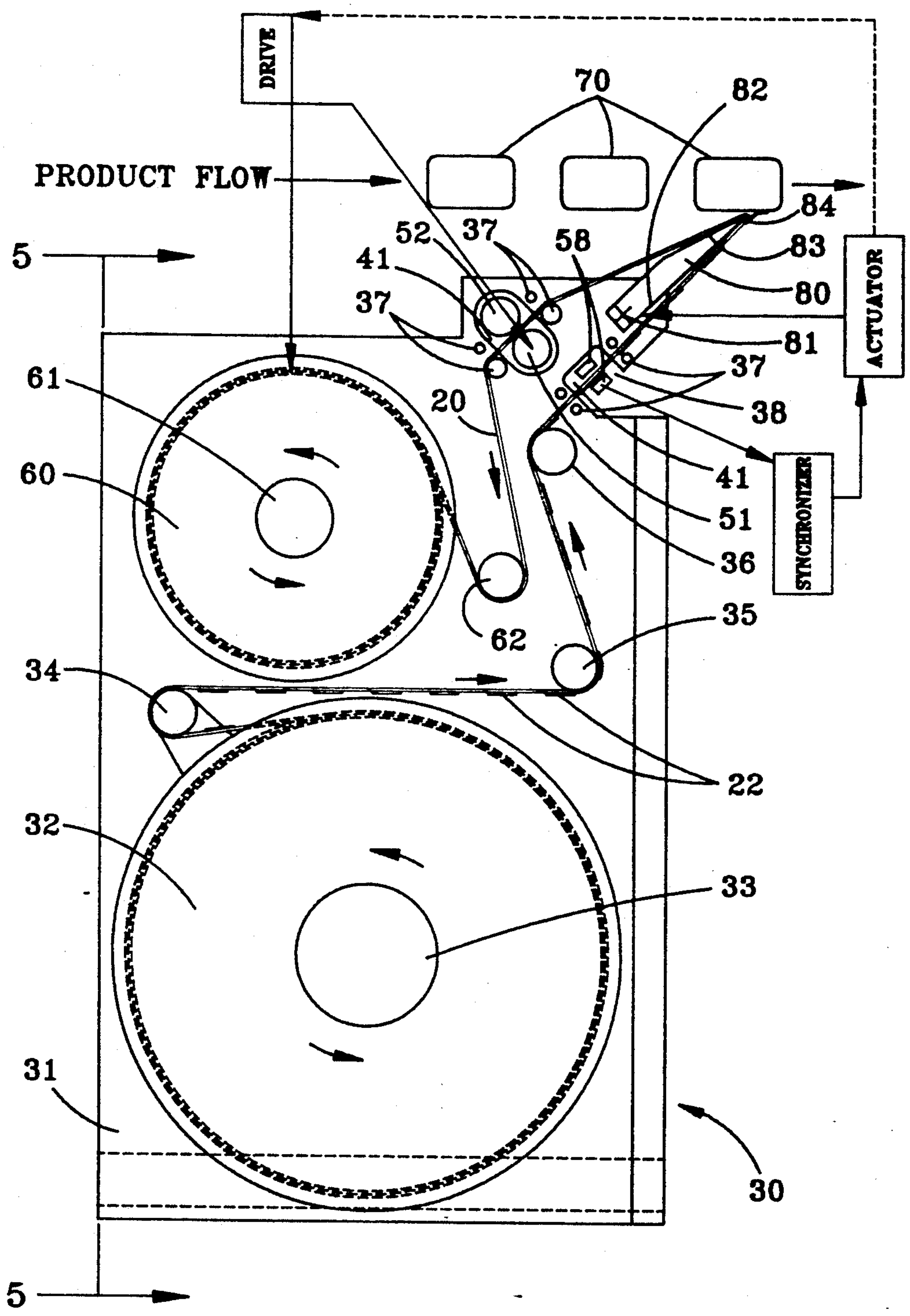
FIG. 4 is a top elevational view of the cassette label applicator head assembly according to the present invention which is illustrated in FIG. 3.
Figure 5:
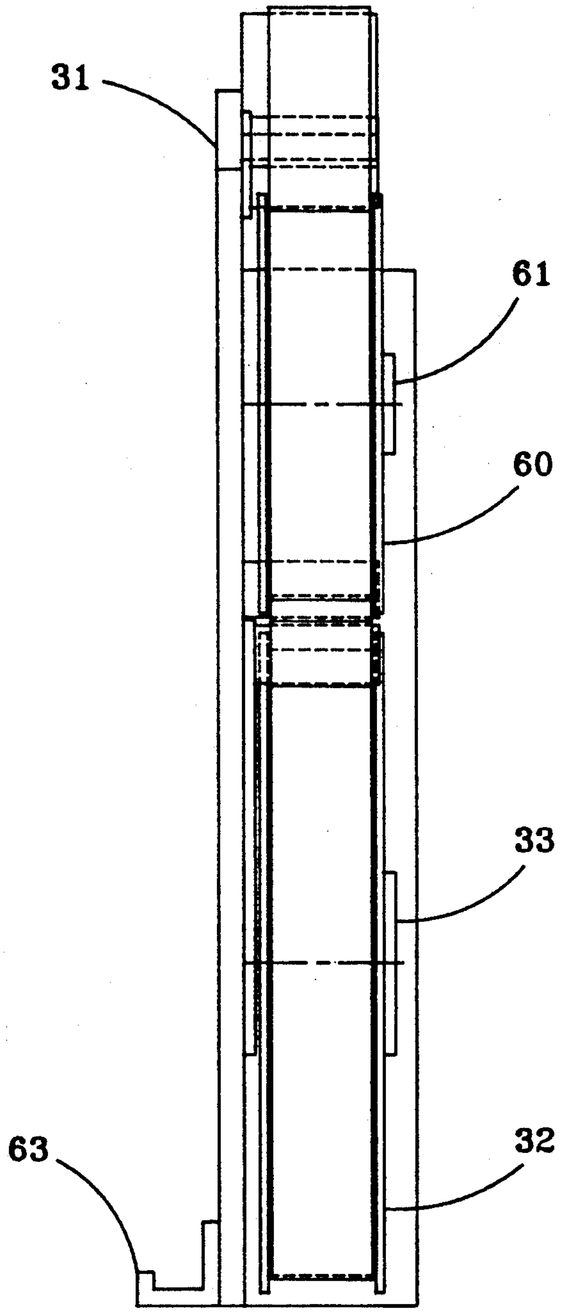
FIG. 5 is an elevational side view of the cassette label applicator head assembly taken along line 5—5 of FIG. 4 and according to the present invention illustrated in FIG. 3.

Looking now at the cassette assembly 30 shown in FIGS. 3–5, a supply spool 33 comprises a shaft or cylindrical member rotatably attached perpendicular to said platform 31. Supply spool 33 is to be of sufficient diameter capable of receiving supply reels 32 of varying diameters and containing labels of varying widths. Supply spool 33 is preferably attachable to platform 31 in alternative positions to accommodate various sized supply reels 32. Supply reel 32 is maintained on supply spool 33 by any means known in the art.

Supply reel 32 carries a length of flexible web material or release liner 20 which carries a supply of labels 22 removably attached to web 20 using known adhesives. The path of web 20 through the label applying apparatus of cassette assembly 30 will be described later herein.

A tension or dancer arm 34 is located in immediate proximity to supply roll 32 and serves to maintain a tension on the web 20, protect the web 20 from breaking and control the unwinding of web 20 from supply reel 32. Dancers are well known and dancer 34 functions similar to dancer 22 described in the prior art and illustrated in FIG. 1.

First idler roller 35 and second idler roller 36 are located downstream from the supply reel 32 in the labeling process. Idler rollers 35 and 36 are attached to platform 31 so as to be freely rotatable in the same plane as the rotation of supply roll 32. Idler rollers 35 and 36 function primarily to guide web 20 and maintain alignment of the web 20. Idler rollers 35 and 26 may be of varying diameters and such rollers are commonly used in the industry.

Numeral 58 denotes a fiber termination receiver and emitter which communicate a light beam capable of determining the density of web 20 for detecting the present or absence of a label 22. Receiver and emitter assembly 58 are connected via fiber optic cables 56 to a label sensor 57 which translates and interprets the information. The use of label sensors 57 via fiber optic technology is well known in the art. Light is passed from the emitter portion of assembly 58 and passed through the web 20 and/or the label 22. The intensity of this light is measured by the receiver portion of assembly 58. This variation in light intensity is converted to electrical output and used to stop further dispensing of the web 20.

Fiber termination receiver and emitter assembly 58, fiber optic cable 56 and label sensor 57 are preferably incorporated into the applicator head 50 and are not a part of the removable cassette assembly 30. Receiver and emitter assembly 58, as shown in FIGS. 2–4, is positioned on applicator head 50 in a manner such that web 20 will pass between the two components when a prethreaded cassette assembly 30 is attached thereon. FIG. 2 discloses emitter and receiver assembly 58 as insertably incorporated into the peeler arm 80. An alternative location for emitter receiver assembly 58 is shown in FIGS. 3–4 and perhaps most clearly in FIG. 4. A notch 40 is found in platform 31 to permit the passage of emitter and receiver assembly 58, therethrough for operative passage of web 20 therethrough. In this embodiment, emitter/receiver assembly 58 is positioned between second idler rollers 36 and arm 80.

Peeler arm 80 is attached to platform 31 at a position similar to that indicated by numeral 81, shown in FIG. 4. Peeler arm 80 may be mounted by any means known in the art. At the end of peeler arm 80 opposite mounting point 81, peeler arm 80 has a convex tip structure 84 formed by the convergence of upstream surface 82 and downstream surface 84 to a point of intersection thereby resulting in the formation of an acute angle. Convex tip 84 causes web 20 to deflect sharply around tip 84 and cause web 20 to peel away thereby exposing the adhesive coated side of label 22. Downstream surface 82 is preferably flat and substantially parallel to and in contact with the adjacent portion of web 20.

FIGS. 2 and 4 illustrate different embodiments of an aperture 41 in platform 31. Aperture 41 may be of any geometric shape but must be of sufficient size and located in such a manner to permit the easy passage of drive roller 51 and pressure roller 52 on applicator head 50. When cassette assembly 30 is attached onto applicator head 50. Web 20 is to pass across aperture 41 and between drive roller 51 and pressure roller 52. Alternatively, drive roller 51 and pressure roller 50 can be rotatably mounted onto platform 31 and positioned so as to engage a drive shaft of drive mechanism 71.

One or more additional idler rollers, such as is shown as numeral 62 in FIG. 4 may be employed on platform 31 after the web 20's exit from drive 51 pressure roller 52 assembly.

Once the label 22 from web 20 has been applied to product 70, the expended release liner or web 20 is collected onto take-up reel 60 rotatably mounted on take-up spool 61. Takeup spool 61 in the preferred embodiment is driven by take up drive 74 of drive mechanism 71.

FIG. 2 illustrates a dancer 64 cooperatively attached to maintain tension and reduce slack on the takeup reel 60. However, while dancer 64 may be preferable in certain instances its presence is not required.

The orientation of each component and the pathway through which web 20 travels is perhaps best illustrated in FIG. 4. A continuous length of web material 20 containing labels 22 is pulled from supply roll 32 causing the same to rotate in a direction identified by the arrows 65. The web 20 is pulled over and around dancer 34 which maintains a tension on the web 20. As the web 20 leaves dancer 34 it traverses perpendicular to platform 31's longitudinal axis and passes around idler roller 35 makes a generally 90° turn away from supply roller 32 and across a second idler roller 36. As web 20 passes idler roller 36 it is directed across notch 41 and along the upstream surface 82 of peeler arm 80. To assure proper alignment of the web across notch 41 so that emitter and receiver assembly 58 will operatively engage the web as cassette assembly 30 is connected to applicator head 50, a plurality of guide pins 37 may be provided.

Guide pins 37 are provided in the form of bars or cylinders fixedly attached to platform 31 to guide web 20 and to restrict lateral movement of the web 20. Any number of guide pins 37 may be utilized along the web 20 pathway and are preferably in pairs, with one guide pin 37 located on each side of web 20. Although FIG. 3 and 4 illustrate guide pins as forming a line perpendicular to the path of web 20, such pins could be placed in a staggered pattern as well. Guide pins 37 may be permanently attached to platform 31 or be removable after platform is contacted with and threaded on applicator head 50.

Figure 10:
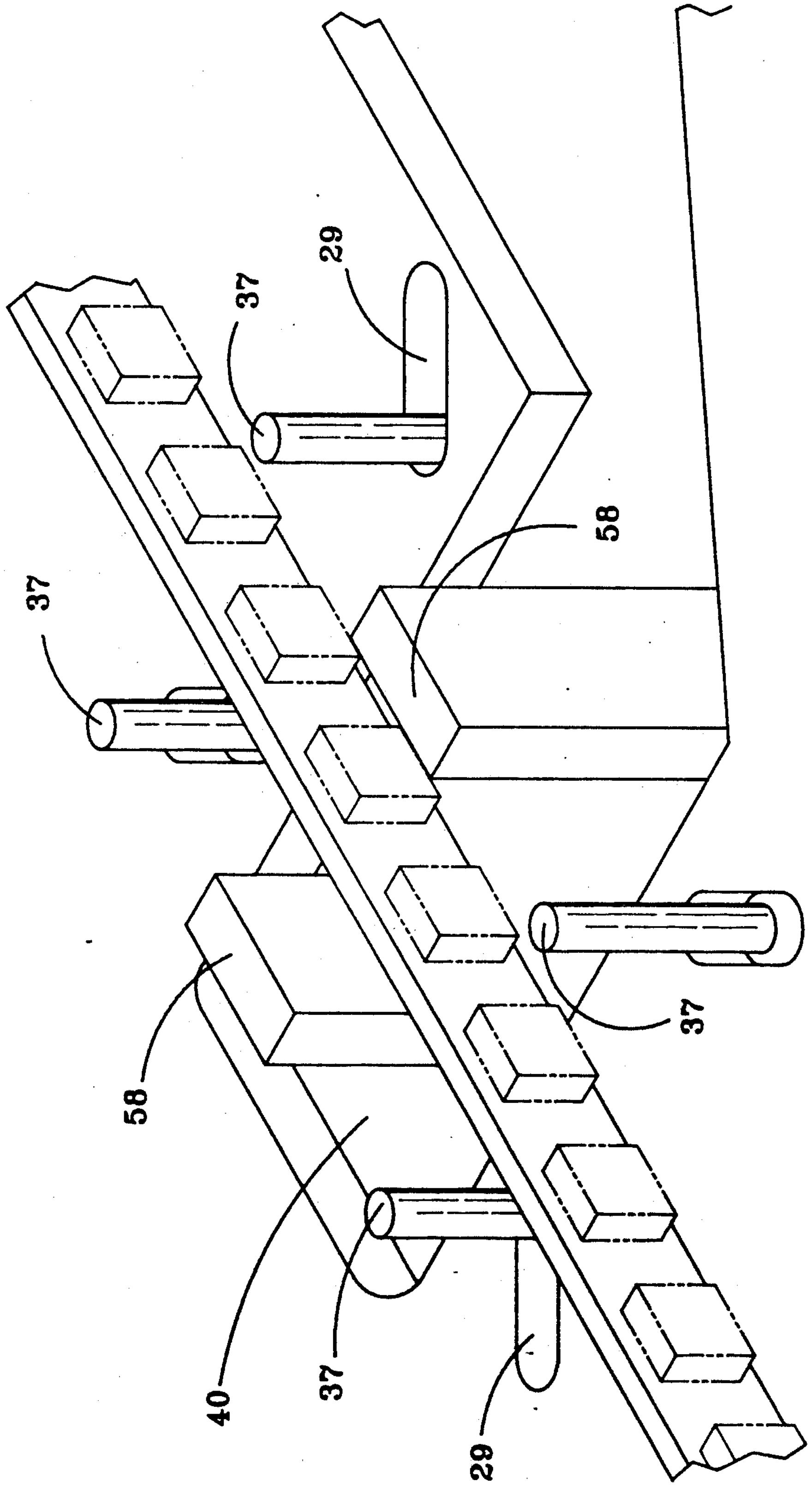
FIG. 10 is an enlarged perspective view of one embodiment of the present invention utilizing guide pins slidably engaging an elongated slot or groove, illustrating the guide pins in a position of close proximity to the web for the purpose of restricting web movement during threading onto an applicator head assembly.
Figure 11:
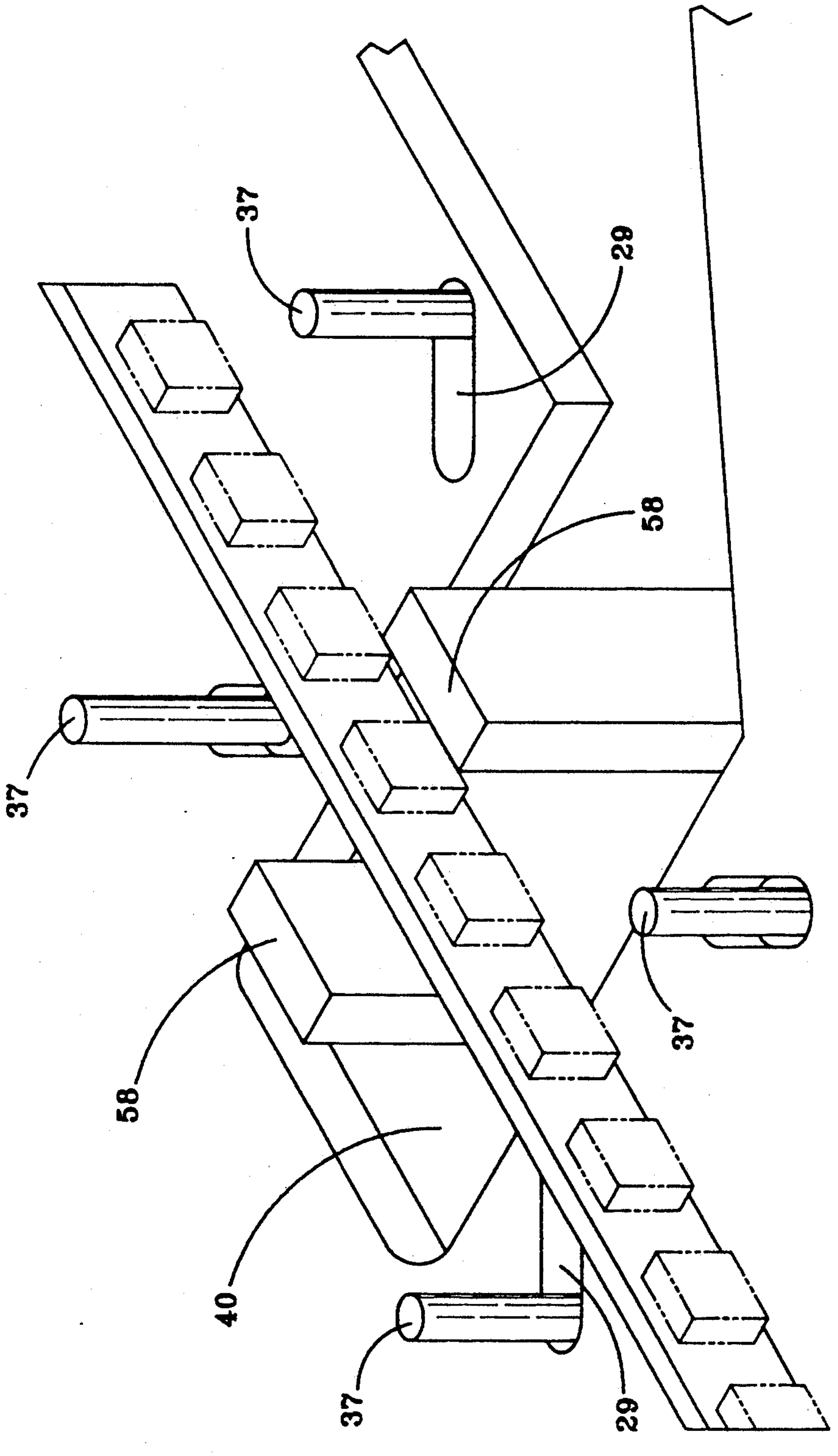
FIG. 11 is an enlarged perspective view of one embodiment of the present invention utilizing guide pins slidably engaging an elongated slot or groove, illustrating the guide pins in an alternative position to the position illustrated in FIG. 10 wherein the guide pins occupy a position at a distance from the web so as not to affect the movement of the web across the cassette once the cassette assembly has been installed and threaded onto the applicator head assembly.

Alternately, guide pins can be installed so as to have alternate positions wherein a first position presents a pair of pins 37 in close proximity to one another allowing only sufficient clearance for a label bearing web 20 as shown in FIG. 10. In this way, proper threading of the web 20 through the emitter/receiver assembly 58 and the drive roller 51/pressure roller 52 is achieved as cassette assembly 30 is placed onto applicator lead 50. A second or disengaged position illustrated in FIG. 11 shows the pins as having a clearance between a pair of pins 37 substantially greater than found in first portion as guide pins would not interfere with the operation of the labeling process.

A means for guiding web 20 through the pathway on platform 31 is illustrated as a plurality of guide pins 37. Alternatively, a plurality of rollers or rotatably mounted cylinders of similar orientation with respect to the web is contemplated.

The web 20, after passing through the guide pins of either side of notch 41 passes along the upstream surface 82 of peeler arm 80 and around the tip structure 84 at which point the label 22 leaves the web 20 as previously described. This process whereby the web is fed about tip 84 to cause the separation of web 20 and label 20 is known in the art as "flagging". This is commonly referred to as the labeling site and is the point at which the label 22 contacts product 70. In specific embodiments the peeler arm 80 can be rotatably mounted at position 81 so as to move through an arc about axis 81 in the same plane as the label 22 travels throughout the pathway.

Thereafter, web 20 with the labels 22 removed therefrom continues around the opposite side of the peeler arm 80 through at least one set of guide pins 37 and across aperture 41 and through a second set of guide pins 37. When cassette assembly 30 is attached to applicator head 50 drive roller 51 and pressure roller 51 assembly of applicator head 50 will protrude through aperture 41 of platform 31 to operatively engage web 20. Subsequently, the web 20 passes over one or more idler rollers such as 62 and is collected on takeup reel 60 which revolves around takeup spool 61 in the direction denoted by arrow 67.

FIG. 5 taken across line 5—5 at FIG. 4 is a side view further illustrating the spacial orientation between components on cassette assembly 30.

FIG. 6–9 illustrate alternative embodiments of the cassette assembly 30 and applicator head 50' wherein the peeler arm 80' is mounted in a position which is essentially perpendicular to the rotation of supply reel 32' and takeup reel 60'. Such embodiments are desirable as a means of conserving space or for labeling alternative panels of product 70. The embodiments illustrated in cassette assembly 30' do necessitate an approximate 90° rotation of the web 20, first as it passes between idler rollers 35' and 36' and again as the web 20 leaves drive roller 51/pressure roller 52 assembly to be guided around idler roller 62' for takeup on takeup reel 60'.

Figure 6:
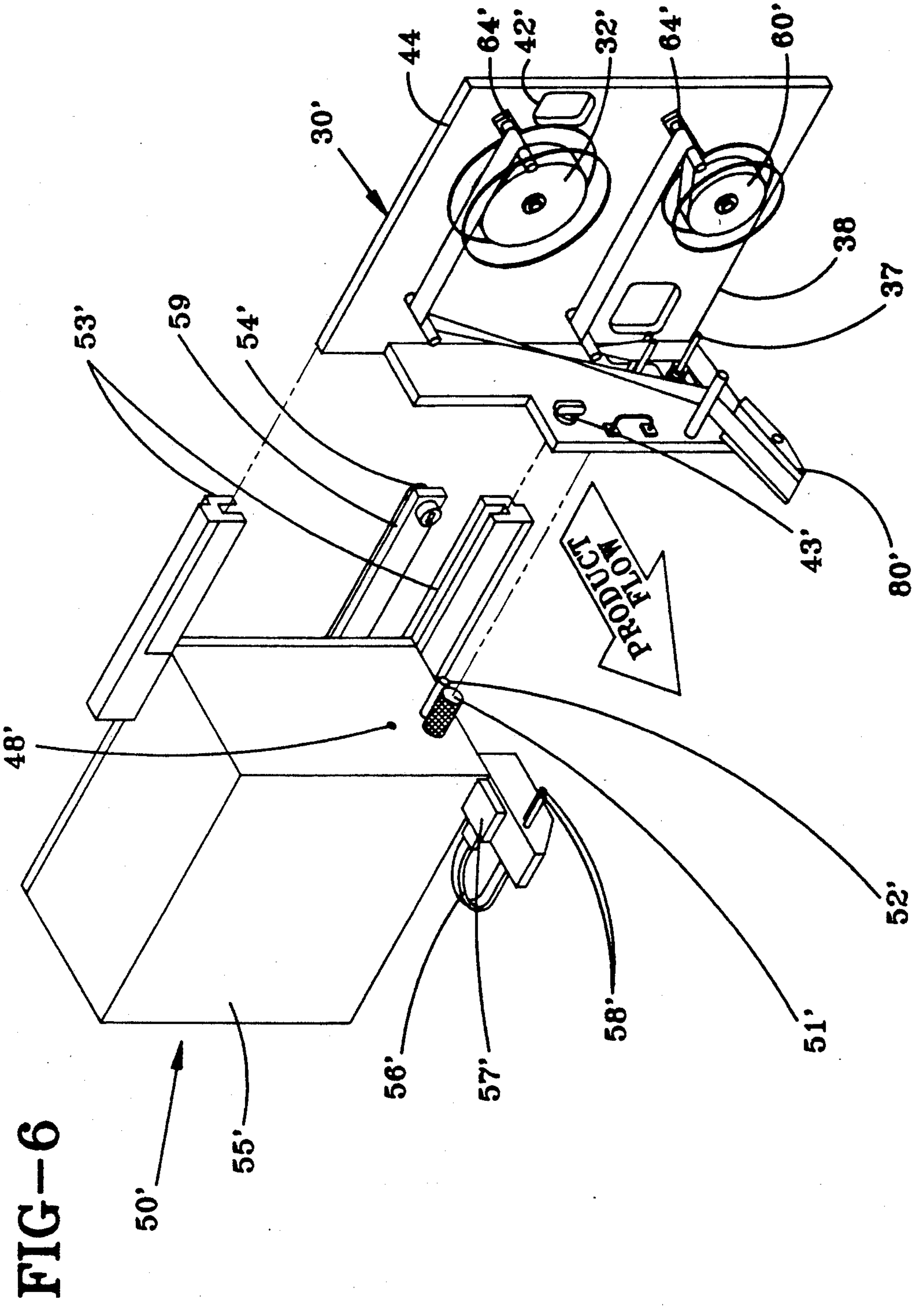
FIG. 6 is an exploded view of an alternative embodiment of a cassette label applicator head assembly as it engages a corresponding applicator head.

In FIG. 6, edges 44 and 38 of platform 31' engage the notches 45' of attachment guides 53' in a manner similar to that shown in FIG. 2. Aperture 48' and drive roller 51'/pressure roller 52' are located on surface 49' of drive enclosure 55'. However, takeup drive 54' is oriented perpendicular to surface 49' and outward therefrom by takeup arm 59 so as to properly engage takeup spool 62' when cassette assembly 30' is secured on applicator head 50'.

Figure 7:
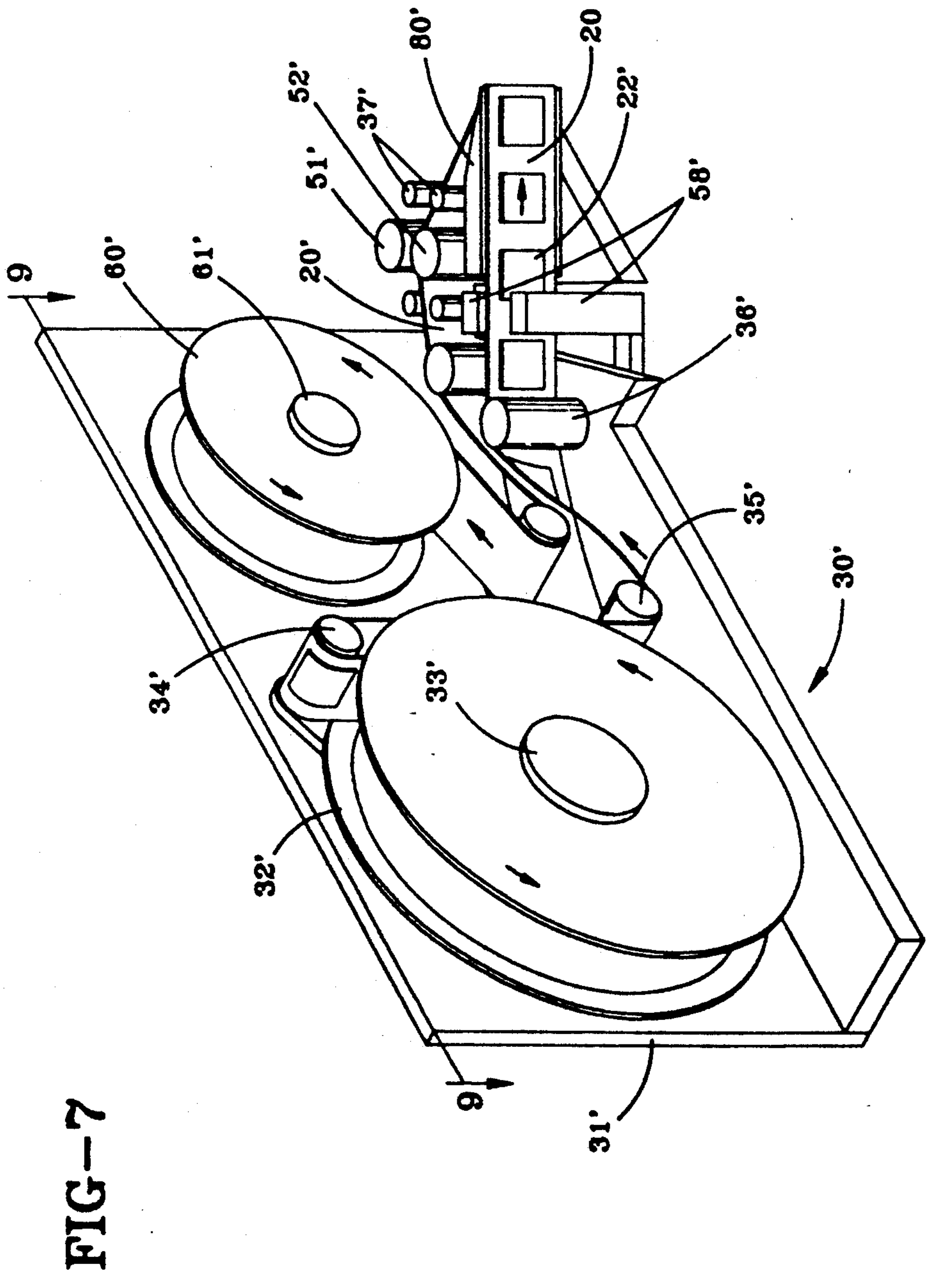
FIG. 7 is a perspective view of a second embodiment of a cassette applicator head assembly according to the present invention.

FIG. 7 advances an embodiment similar to the device of FIG. 6 with several variations. The receiver/emitter assembly 58' is located upstream from peeler arm 80 and an integral part of cassette assembly 30'. Receiver/emitter assembly 58' is, thereinafter, operatively connected to label sensor 57' upon cassette assembly 30's attachment to applicator head 50'.

Figure 8:
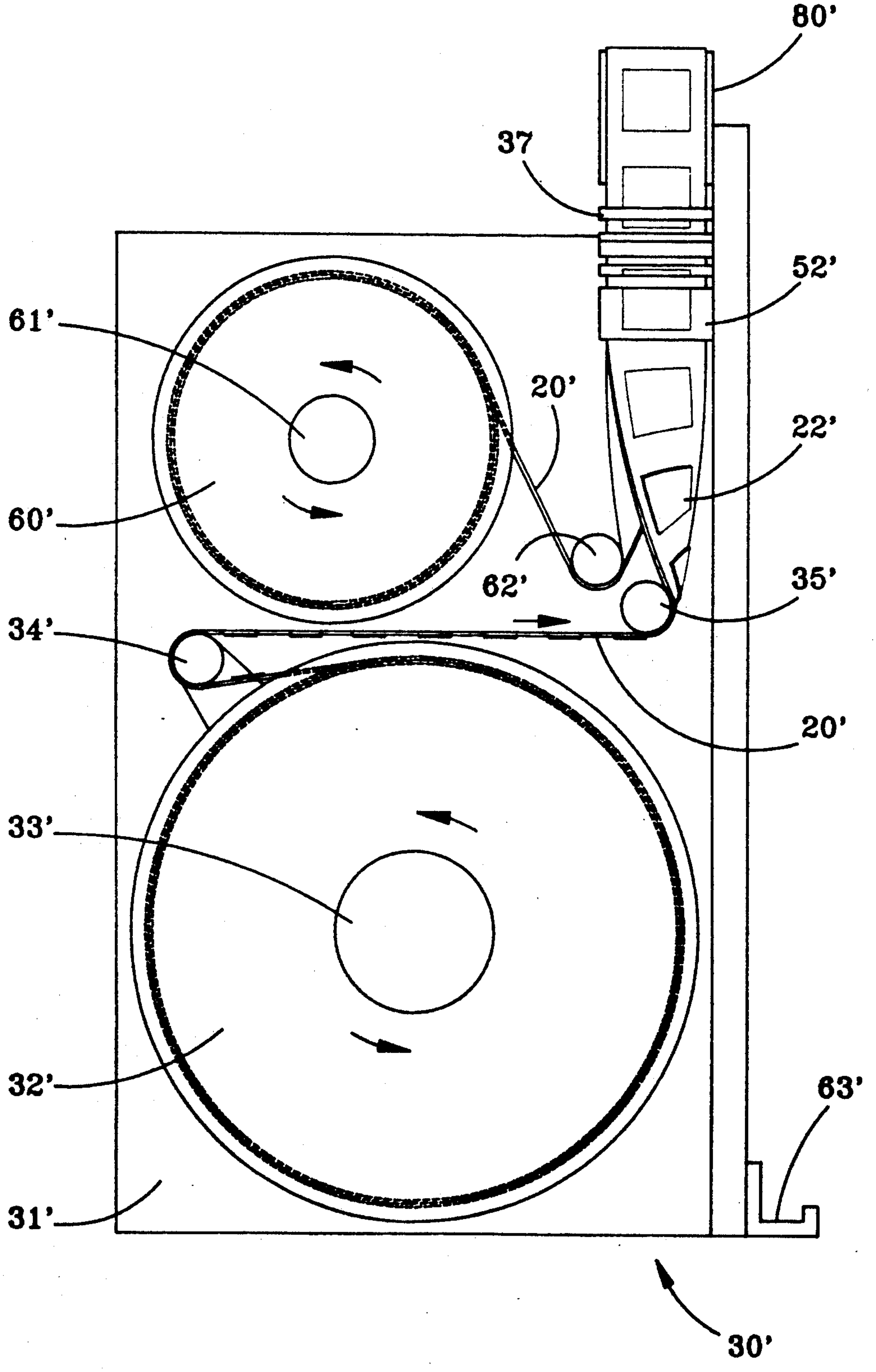
FIG. 8 is a top elevational view of the cassette label applicator head assembly according to the present invention and which is illustrated in FIG. 7.
Figure 9:
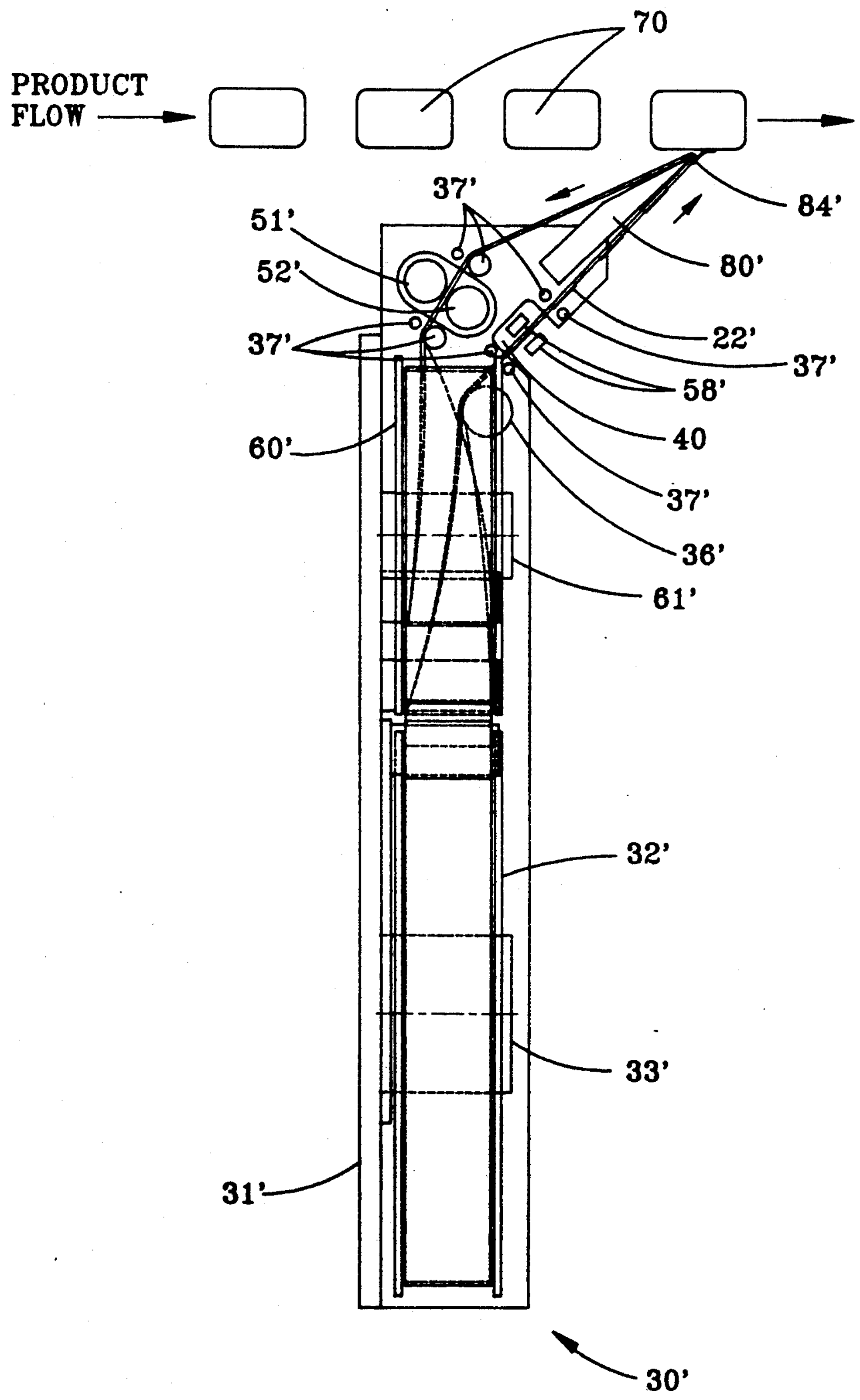
FIG. 9 is an elevational side view of the cassette label applicator head assembly taken along line 9—9 of FIG. 7 and according to the present invention illustrated in FIG. 7.

FIG. 8 discloses a front view of the cassette assembly 31' illustrated in FIG. 7 and discloses means of attachment 63' described previously herein with reference to FIG. 3. FIG. 9 discloses a view taken across line 9—9 wherein a notch 41' has been formed in platform 31' to permit the passage of a emitter/receiver assembly 58 which is integral with applicator head 50' as was described with reference to FIG. 3.

Peeler arms 80 and 80' may incorporate a label wiper as illustrated by numeral 24 in the prior art FIG. 1, to aid in the smooth and uniform contact of label 22 to product 70. Label wipers, such as label wiper 24, are well known in the art.

A plurality of handles such as those evidenced by numeral 42 in FIG. 2 and 42' in FIG. 6 allow for ease of the operator in grasping and handling cassette assemblies 30 and 30'. However, any means for aiding the operator in the handling of the cassette assemblies 30 and 30' may be utilized.

For the purpose of aiding in the security of controlled labels, such as for pharmaceutical products, an applicator is often equipped with a digital readout label counter (not shown). This counter may be non-setable or be resetable by means of a push button or a key lock. As a further advancement of the invention, a battery operated counter may be incorporated as a part of the cassette, so that evidence of the number of labels applied to products is returned to the controlled area alone with the unused labels in the cassette. Additionally, an area of the outside of the cassette may be finished with a release coating for the purpose of temporary attachment of dispensed labels which, for any reason, were not applied to containers, for subsequent return to the controlled area along with cassette, unused labels still on the roll, and non-reset counter reading.

It is to be understood that the applicator heads 50 and 50' may be incorporated into labeling systems in a variety of different positions for labeling top, bottom or side product panels and that the cassette assemblies and any of their components may vary in size to accommodate a variety of different labels. Furthermore, while the preferred arrangement of components of each cassette assemblies has been disclosed, alternative arrangements may be desirable in certain applications.

While in accordance with the patent statutes the best mode and preferred embodiment of the invention have been described, it is to be understood that the invention is not limited thereto, but rather is to be measured by the scope and spirit of the appended claims.

What is claimed is:

1. An improved apparatus for applying labels to a preselected surface on a plurality of products which move in succession along a path of travel past a labeling site, of the type including a label applying means at said labeling site, a supply means for feeding a label bearing web to said applying means, a means for routing the web over a transport pathway including said labeling site, a drive means for controllably advancing said web and a control means for regulating the operation and speed of said drive means and correspondingly the application of said label to said surface wherein the improvement comprises:

an application head assembly having a web drive means comprising a drive roller and a pressure roller operatively mounted thereon, said drive roller and pressure roller positioned to accept said label bearing web therebetween and adapted to engage and advance said web;

a removable cassette assembly comprising a platform to receive a plurality of sub-assemblies, including a supply reel containing a length of label bearing web, a means for routing said web along a pathway, a label applying means for applying labels to said products from essentially the same direction as said product path, a take-up reel for collecting said web, and an aperture in said platform across which said web pathway extends such that said web drive roller and pressure roller of said applicator head assembly pass through said aperture perpendicular to said web pathway and operatively engage opposite sides of said web on said pathway when said cassette assembly is mounted on said applicator head assembly; and a means for removably mounting said cassette assembly to said applicator head assembly without disabling the path of travel of said products and wherein said web is operatively engaged between said drive roller and said pressure roller such that said apparatus is thereafter capable of applying labels without further external connection.

2. The improved labeling device as recited in claim 1 wherein said label applying means comprises a peeler arm positioned at said labeling site for removing sequentially aligned labels from said web and applying said labels to the surface of said objects.

3. The improved labeling device as recited in claim 1 wherein said cassette assembly comprises a means for maintaining a tension on said web as it moves through said pathway.

4. The improved labeling device as recited in claim 1 wherein said improvement comprises a means for aligning set cassette assembly onto said applicator head assembly.

5. The improved labeling device as recited in claim 1 wherein said applicator head assembly further comprises a rotating means for rotatably moving said take-up reel, said rotating means positioned so as to operatively engage said take-up reel on said cassette assembly.

6. The improved labeling device as recited in claim 1 wherein said applicator head assembly further comprises a sensor means for detecting the presence and position of a label and producing control signals for said control means.

7. The improved labeling device as recited in claim 6 wherein said sensor means comprises a fiber termination receiver and emitter assembly.

8. The improved labeling device as recited in claim 1 wherein said cassette assembly comprises a guide means for restricting the lateral movement of said web along said pathway and for guiding said web into operative engagement with said applicator head assembly when said cassette assembly is removable attached thereon.

9. The improved labeling device as recited in claim 1 wherein said improvement further comprises a locking means for removably securing said cassette assembly to said applicator head assembly.

10. The improved labeling device as recited in claim 1 wherein said label applying means is mounted on said platform of said cassette assembly in a parallel relationship to the rotation of said supply means.

11. The improved labeling device as recited in claim 1 wherein said label applying means is mounted on said platform of said cassette assembly in a relationship perpendicular to the rotation of said supply means.

12. An improved apparatus for applying labels to a preselected surface on a plurality of products which move in succession along a path of travel past a labeling site, of the type including a label applying means at said labeling site, a supply means for feeding a label bearing web to said applying means, a means for routing the web over a transport pathway including said labeling site, a drive means for controllably advancing said web and a control means for regulating the operation and speed of said drive means and correspondingly the application of said label to said surface wherein the improvement comprises:

an applicator head assembly having a web drive means operative mounted thereon;

a removable cassette assembly comprising a platform to receive a plurality of sub-assemblies including, a supply reel containing a length of label bearing web, a means for routing said web along a pathway, a label applying means for applying labels to said product from essentially the same direction as said product path, a take-up reel for collecting said web and a drive roller and a pressure roller aligned in close proximity to one another and on opposite sides of said web, said drive roller engaging said drive means on said applicator head assembly so as to rotate cooperatively with said pressure roller to engage and advance said web along said pathway; and a means for removably mounting said cassette assembly to said applicator head assembly without disabling the path of travel of said drive of said products such that said drive roller engages said means and said apparatus is thereafter capable of applying labels without further external connection.

13. A cassette assembly as recited in claim 12 wherein said label applying means comprises a peeler arm for removing sequentially aligned labels from said web and applying said labels to the surface of said objects.

14. A cassette assembly as recited in claim 12 wherein said cassette assembly further comprises a means for maintaining a tension on the web as it moves through said pathway.

15. A cassette assembly as recited in claim 12 wherein said cassette assembly further comprises a means for aligning said cassette assembly onto the applicator head assembly.

16. A cassette assembly as recited in claim 24 wherein said cassette assembly further comprises a means for removably attaching said cassette assembly onto said applicator head assembly.

17. A cassette assembly as recited in claim 12 wherein said cassette assembly further comprises a sensor means for detecting the presence and position of a label.

18. A cassette assembly as recited in claim 17 wherein said sensor means comprises a fiber termination receiver and emitter assembly.

19. A cassette assembly as recited in claim 12 wherein said cassette assembly further comprises a guide means for restricting the lateral movement of said web and for guiding said web into operative engagement with said applicator head assembly once head assembly is removably attached thereon.

20. A cassette assembly as recited in claim 12 wherein said label applying means is mounted on said platform of said cassette assembly in a relationship parallel to the rotation of said supply means.

21. A cassette assembly as recited in claim 12 wherein said label applying means is mounted on said platform of said cassette assembly in a relationship perpendicular to the rotation of said supply means.

22. A process for converting label webs on a labeling system of the type for applying labels to a preselected surface on a plurality of objects which are moved in succession along a path of travel past a labeling site comprising;

a) pre-threading a label bearing web through a pathway on a cassette assembly, said cassette assembly comprising a platform to receive a plurality of sub-assemblies including, a supply reel containing a supply of label bearing web, a means for routing said web along a pathway, a label applying means, a take-up reel for collecting said web, said platform having an aperture formed therein and along said pathway across which said web pathway extends;

b) disengaging a drive means of a label applicator head assembly from a motor, said drive means comprising a drive roller and pressure roller;

c) removing a second cassette assembly from said applicator head assembly;

d) removably attaching said first cassette assembly to said applicator head assembly without disabling the path of travel of said products such that said drive roller and said pressure roller pass through the aperture in said platform, perpendicular to said web pathway of said web so as to engage opposite sides of said web; and e) re-engaging said drive means of said label applicator head assembly to a motor.

23. The process of converting label webs on a labeling system as recited in claim 22 wherein said label applying means comprises a peeler arm for removing sequentially aligned labels from said web and applying said labels to the surface of said products.

24. The process for converting label webs on a labeling system as recited in claim 22 wherein said label applicator head assembly comprises a sensor means for detecting the presence and position of a label.

* * * * *

UNITED STATES PATENT AND TRADEMARK OFFICE

CERTIFICATE OF CORRECTION

PATENT NO. : 5,162,069

DATED : November 10, 1992

INVENTOR(S) : David A. Morris

It is certified that error appears in the above—identified patent and that said Letters Patent is hereby corrected as shown below:

Column 1, line 10 before "cassette" insert -- a --;

Column 1, line 13 before "cassette" insert -- a --;

Column 1, line 15 delete "load" and insert -- head --;

Column 1, line 24 delete "The" and insert -- the --;

Column 1, line 56 delete "arid" and insert -- grid --;

Column 9, line 65 delete "application" and insert -- applicator --;

Column 11, line 16 delete "operative" and insert -- operatively --.

Signed and Sealed this

Fifth Day of October, 1993

*Attest:*

BRUCE LEHMAN

*Attesting Officer*

*Commissioner of Patents and Trademarks*